United States Patent
Reno et al.

(10) Patent No.: US 9,661,013 B2
(45) Date of Patent: May 23, 2017

(54) MANIPULATING API REQUESTS TO INDICATE SOURCE COMPUTER APPLICATION TRUSTWORTHINESS

(71) Applicant: CA, Inc., Islandia, NY (US)

(72) Inventors: James D. Reno, Scotts Valley, CA (US); Thomas E. Hamilton, III, Sudbury, MA (US); Kenneth William Scott Morrison, New Westminster (CA)

(73) Assignee: CA, INC., Islandia, NY (US)

( * ) Notice: Subject to any disclaimer, the term of this patent is extended or adjusted under 35 U.S.C. 154(b) by 207 days.

(21) Appl. No.: 14/291,484

(22) Filed: May 30, 2014

(65) Prior Publication Data
US 2015/0350234 A1     Dec. 3, 2015

(51) Int. Cl.
*G06F 11/00*     (2006.01)
*H04L 29/06*     (2006.01)
*H04L 29/08*     (2006.01)
*G06F 21/57*     (2013.01)
*G06F 21/85*     (2013.01)

(52) U.S. Cl.
CPC .......... *H04L 63/1433* (2013.01); *G06F 21/57* (2013.01); *G06F 21/85* (2013.01); *H04L 67/02* (2013.01); *H04L 63/08* (2013.01); *H04L 63/1441* (2013.01); *H04L 2463/121* (2013.01)

(58) Field of Classification Search
CPC ............................. H04L 63/1433; G06F 21/85
USPC ........................................................ 726/25
See application file for complete search history.

(56) References Cited

U.S. PATENT DOCUMENTS

| | | | | |
|---|---|---|---|---|
| 8,527,418 | B2* | 9/2013 | Enzaldo | G06Q 40/02 705/35 |
| 8,683,052 | B1* | 3/2014 | Brinskelle | H04L 63/0823 709/228 |
| 9,448,859 | B2* | 9/2016 | Gathala | G06F 9/541 |
| 2009/0024663 | A1* | 1/2009 | McGovern | G06F 21/577 |
| 2010/0031358 | A1* | 2/2010 | Elovici | H04L 12/2602 726/24 |
| 2015/0200955 | A1* | 7/2015 | Martin | G06F 21/562 726/23 |
| 2015/0332184 | A1* | 11/2015 | Osborn | G06Q 10/00 705/7.28 |

* cited by examiner

*Primary Examiner* — Farid Homayounmehr
*Assistant Examiner* — Suman Debnath
(74) *Attorney, Agent, or Firm* — Sage Patent Group

(57) ABSTRACT

Methods of operating an application programming interface (API) request risk assessment system include receiving an API request from a source computer application that is directed to a destination computer application. A risk assessment score is generated based on a characteristic of the API request. The risk assessment score indicates a level of trustworthiness of the source computer application. Deliverability of the API request to the destination computer application is controlled based on the risk assessment score. Related methods of operating a source computer and related operations by API request risk assessment systems and source computers are disclosed.

9 Claims, 6 Drawing Sheets

MANIPULATING API REQUESTS TO INDICATE SOURCE COMPUTER APPLICATION TRUSTWORTHINESS

TECHNICAL FIELD

The present invention relates generally to a networked system of computers and, more particularly, to the management of application programming interface requests through applications on computers.

BACKGROUND

Attacks carried out through the Internet against computer applications and computers are increasing in frequency and sophistication. Tools are, presently available to detect and defend against attacks that are carried out through the Internet against HTML interface web applications. However, these tools are strictly targeted at those specific types of attacks. This results in many other types of computer systems, such as computer systems hosting cloud services, remaining vulnerable to attack although they may have a much greater consequential harm if compromised.

SUMMARY

Some embodiments disclosed herein are directed to methods of operating an application programming interface (API) request risk assessment system that include receiving an API request from a source computer application that is directed to a destination computer application. A risk assessment score is generated based on a characteristic of the API request. The risk assessment score indicates a level of trustworthiness of the source computer application. Deliverability of the API request to the destination computer application is controlled based on the risk assessment score.

Some other embodiments are directed to methods of operating a source computer that includes controlling characteristics of a sequence of API requests that are output toward a destination computer application based on a known pattern of differences that an API request risk assessment system which intercepts the sequence of API requests is expecting to observe between the characteristics of the sequence of API requests for determining a level of trustworthiness of computer readable program code on the source computer generating the sequence of API requests.

Some other embodiments are directed to an API request risk assessment system that includes processor circuitry and memory circuitry coupled to the processor circuitry. The memory circuitry includes computer readable program code that when executed by the processor circuitry causes the processor circuitry to perform operations that include receiving an API request from a source computer application that is directed to a destination computer application, generating a risk assessment score based on a characteristic of the API request, and controlling deliverability of the API request to the destination computer application based on the risk assessment score. The risk assessment score indicates a level of trustworthiness of the source computer application.

Some other embodiments are directed to a source computer that includes processor circuitry and memory circuitry coupled to the processor circuitry. The memory circuitry includes computer readable program code that when executed by the processor circuitry causes the processor circuitry to perform operations that include controlling characteristics of a sequence of API requests that are output toward a destination computer application based on a known pattern of differences that an API request risk assessment system which intercepts the sequence of API requests is expecting to observe between the characteristics of the sequence of API requests for determining a level of trustworthiness of the computer readable program code on the source computer.

It is noted that aspects described with respect to one embodiment may be incorporated in different embodiments although not specifically described relative thereto. That is, all embodiments and/or features of any embodiments can be combined in any way and/or combination. Moreover, methods, computers, and/or computer program products according to embodiments will be or become apparent to one with skill in the art upon review of the following drawings and detailed description. It is intended that all such additional methods, computers, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Various embodiments will be described more fully hereinafter with reference to the accompanying drawings. Other embodiments may take many different forms and should not be construed as limited to the embodiments set forth herein. Like numbers refer to like elements throughout.

Some embodiments are directed to reducing security risks associated with the processing of application programming interface (API) requests that are received through APIs of applications on computers, such as applications providing application-to-application Web services or other API application endpoints. Various embodiments disclosed herein are directed to a API request risk assessment system (also referred to as "risk assessment system" for brevity) that determines trustworthiness of the source computer applications (e.g., client computers) based on known manipulations they make to API requests that they output toward destination computer applications (e.g., web service applications, application server applications, or other endpoint applications). A source computer application therefore manipulates one or more API requests that it outputs toward a destination computer application to indicate its trustworthiness (e.g., authenticity).

The source computer application may manipulate content and/or timing of the API request(s) in a way the risk assessment system expects to observe in the API request(s) from a trustworthy (e.g., authentic) source computer application. For example, the source computer application may modify the syntax in a manner known by the risk assessment system to identify the source computer application, and without changing the meaning of the API request or the result of processing by the destination computer application. An unauthentic application may observe or otherwise know the syntax of API requests for accessing a destination computer application, and may operate to attempt to imitate an authentic instance of a source computer application to, for example, misuse/attack services and/or resources of the destination computer. However the unauthentic application would not know the underlying processes utilized by the authentic to manipulate the API requests in a way that the risk assessment system expects to be observe. These and other embodiments are described in further detail below with reference to FIGS. 1-12.

As used herein, an "API request" can be any signaling occurring from one to another software application that may be performed using a defined syntax and one or more parameters (e.g., data structure, object classes, and/or variables) to obtain data therefrom and/or to provide data thereto. For example, SOAP and REST service requests can be performed using a defined API library of remote calls or other types of API requests.

Figure 1:
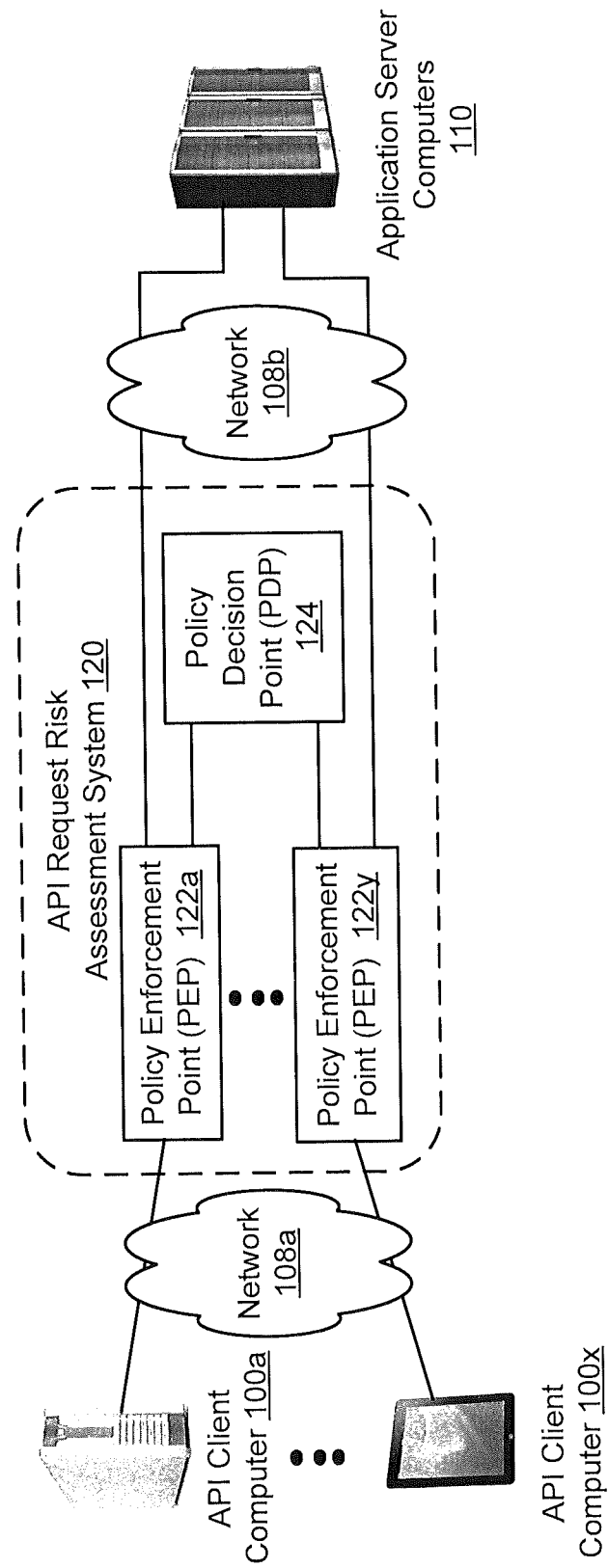
FIG. 1 is a block diagram of a computer system that includes an API request risk assessment system that intercepts and controls deliverability of API requests from API client computers to application server computers, in accordance with some embodiments.

FIG. 1 is a block diagram of embodiments of a computer system that includes an API request risk assessment system 120 that intercepts or observes without intercepting API requests, and controls deliverability of API requests from API client computers 100*a*-100*x* to application server computers 110 for processing.

Referring to FIG. 1, the risk assessment system 120 receives API requests (e.g., Web service API calls, RESTful API requests, etc.) through one or more data networks 108*a* from applications processed by one or more API client computers 100*a*-100*x*. An application processed by one of the API client computers which generates an API request is also referred as one type of "source computer application" for brevity. The risk assessment system 120 generates a risk assessment score based on a characteristic of the API request. The risk assessment score indicates a level of trustworthiness of the source computer application. The risk assessment system 120 controls deliverability of the API request through one or more data networks 108*b*, which may be at least partially the same as the network 108*a*, to one or more of the application servers 110 for processing based on the risk assessment score.

As will be explained in further detail below, the risk assessment score can be generated based on one or more of the following non-limiting example syntax and/or timing characteristics of API requests that can be controlled by the source computer application:

1. known pattern of changes that the source computer application is expected to make to the ordering of parameters contained in API requests across a sequence of the API requests;
2. known pattern of changes that the source computer application is expected to make to values of a parameter contained in API requests across a sequence of the API requests;
3. whether a defined number of blank spaces or other defined characters are present between two parameters, each having a string of characters, contained in the API request;
4. whether a false parameter having a defined characteristic is expected to be contained in an API request based on a known pattern with which the source computer application is expected to selectively include the false parameter having the defined characteristic as content in a sequence of the API requests;
5. an expected timing between receipt of a API request and the receipt of a previous API request from the source computer application; and
6. an expected pattern of timings between receipt of the plurality of API requests from the source computer application.

As explain above, the risk assessment score indicates a level of trustworthiness of the source computer application, such as whether the source computer application is sufficiently identifiable as being an application that is authorized to use services and/or resources provided by one or more of the application server computers 110.

In one embodiment, a risk assessment score of zero indicates the highest likelihood that an API request was received from an authentic application that is authorized to access services and/or resources of one or more of the application server computers 110 through the associated APIs or, in other words, the lowest potential risk of the API request being received from an unauthentic application (e.g., an application falsely imitating an authentic application for purposes of misusing/attacking services and/or resources of one or more of the application server computers 110). In contrast a risk assessment score of 100 indicates the lowest likelihood that an API request was received from an authentic application or, in other words, the highest potential risk of the API request being received from an unauthentic application.

Because the risk assessment is performed by the risk assessment system 120 and may be performed before the API request reaches and is processed by an application on any of the application server computers 110, the application can be protected from potential damage and the amount of checking of the API request can be reduced that is performed by the application or another component of the application server computers 110 to obtain a desired level of security when processing API requests.

The API client computers 100*a*-100*x* or other types of source computers can be any type of computers that process applications to generate API requests, such as Web service API calls, RESTful API requests, etc., and may include, but are not limited to desktop computers, laptop computers, tablet computers, smart phones, application servers, and mainframe computers. The application server computers 110 and other types of destination computers may correspondingly be any type of computers having applications that expose services and/or resources through APIs and process API requests received through APIs, such as Web service API calls, RESTful API requests, etc., and may include, but are not limited to mainframe computers, application server equipment, desktop computers, laptop computers, tablet computers, and smart phones.

As illustrated in FIG. 1, operations of the risk assessment system 120 may reside in a plurality of policy enforcement points (PEPs) 122*a*-122*y* and a policy decision point (PDP) 124. One or more of the PEP's 122*a*-122*y* may be processed by a same computer host as the PDP 124, or may be processed on physically separate computer hosts that have different network addresses and communicate with each another through one or more data networks (e.g., 110*a/b*, etc). Accordingly, the PDP 124 may operate as a centralized policy decision point for the plurality of geographically dispersed and communicatively connected PEP's 122*a*-122*y* that control deliverability of API request from any number of source computers (e.g. API clients 100*a-x*) to any number of destination computers (e.g. application server computers 110). Although a single PDP 124 and two PEPs 122*a-y* are shown in FIG. 1, it is to be understand that any number of PDP 124 and PEP 122 may be used with various embodiments disclosed herein. Moreover, one or more of these embodiments may be implemented in any type of computers and are not limited to use in a PDP and/or PEP.

The PEP(s) 122 can be responsible for generalized message processing of Web service and other API requests. These requests can include SOAP messages using a variety of transport bindings including, but not limited to, HTTP(s), Message-Oriented Middleware (MOM) such as ActiveMQ, email, TCP sockets, (s) FTP(s), etc), API requests following the RESTful architectural pattern can include HTTP(s) transport and message content types that include, but are not limited to, simple text, binary attachments, XML documents, JSON structures, etc. The PEP(s) 122 can also be responsible for application of rules (policy) to Web services or other API requests. The rules can define an algorithm applied to an API request in flight that has not yet been delivered to the destination computer. The algorithm can control one or more of: identification of an application on a source computer that output the API request (based on one or more embodiments disclosed herein); authentication of credentials associated with the API request; validation of content of the API request; modification of content of the API request; and routing of the API request content to the destination computer 110 and/or another computer of the system and/or another system. Evaluation of these steps may occur locally for performance reasons; however, some steps may leverage additional external infrastructure elements such as directories, databases, or various PDPs such as described herein.

The PDP can be a rules engine that is optimized for risk evaluation based on indications of the trustworthiness of source computer applications that output API requests. The rules can include rule sets that are compared (e.g., evaluated to determine if one or more is satisfied) to content of an API request, differences between a series of API requests, timing of an API request, timing between a series of API requests, and/or other characteristics described herein to generate a risk assessment score. Rule sets that detect typical authentic applications and/or unauthentic applications can be defined or developed by learning-based processes over time. In addition, rule sets can be customizable to detect emerging threats or to accommodate unique security or other needs of particular destination computers and/or applications thereon that process API requests.

Various potential advantages that may be obtained by separating operations of the PEP from operations of the PDP may include, but are not limited to: 1) enabling administrative separation of concerns between the administration of PDP risk-associated policy and rule sets and the administration of PEP message-in-flight handling policy (including remediation action(s) based on risk assessment score); and/or 2) allowing a single PDP to serve many PEP instances which can provide favorable reuse efficiencies for enterprise systems having many API clients and/or many application servers.

Figure 2:
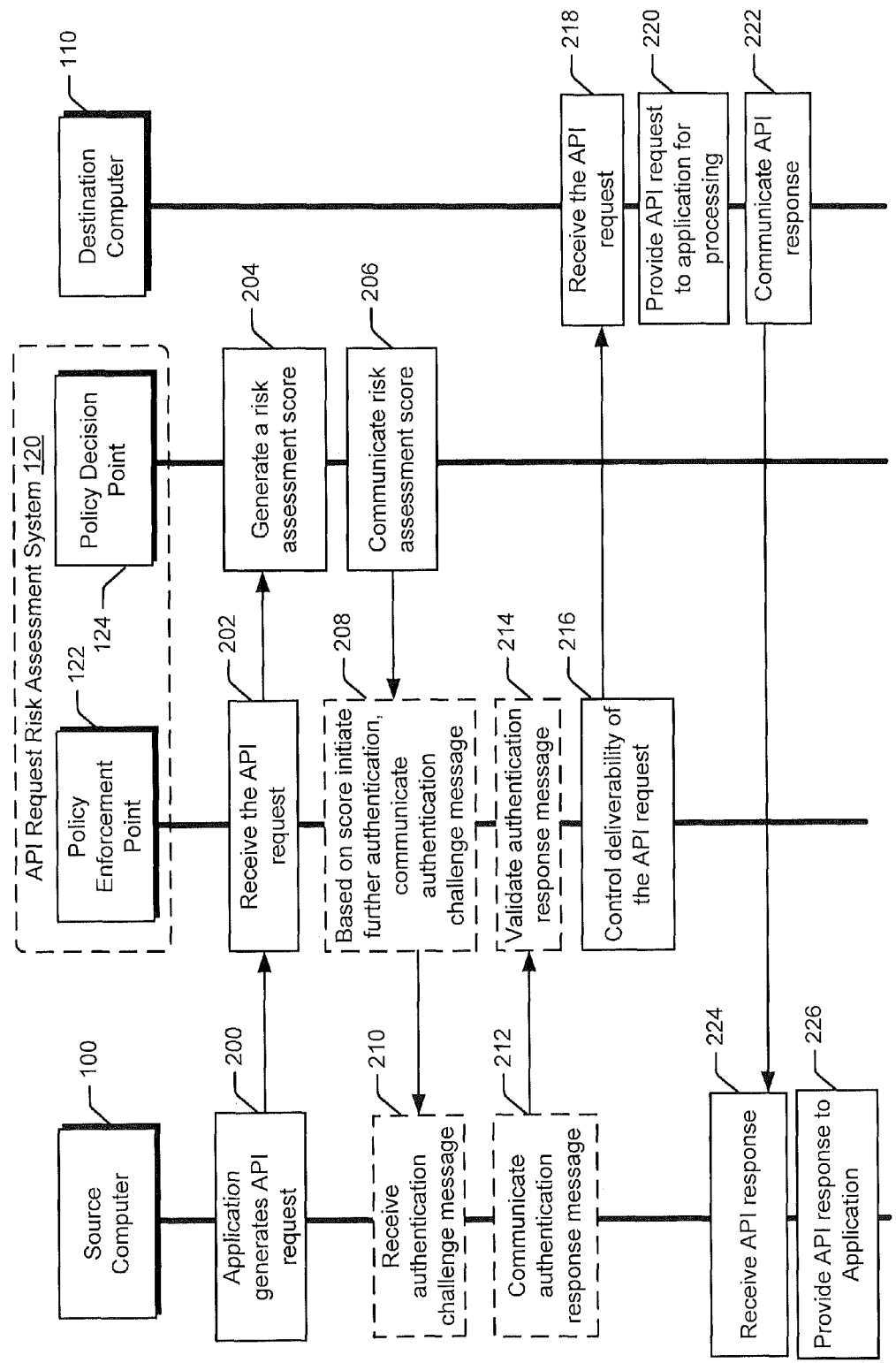
FIG. 2 is a flowchart of operations and information flows that may be performed by the components of FIG. 1, in accordance with some embodiments.

FIG. 2 is a flowchart of operations and information flows that may occur between the system components of FIG. 1, in accordance with some embodiments. Referring to FIG. 2, an application processed by the source computer 100 (e.g., API client computer 100*a*) generates (block 200) an API request that is communicated through a data network for processing by one or more applications on a destination computer 110 (e.g., application server computer 110). In accordance with some embodiments disclosed herein, the source computer application controls characteristics of a sequence of API requests based on a known pattern of differences that the risk assessment system 120 is expecting to observe between the characteristics of the sequence of API requests for determining a level of trustworthiness of the source computer application.

The PEP 122 receives (block 202) the API request, and may be configured to intercept the API request to prevent it from reaching the destination computer 110 without the PEP 122 first authorizing its delivery to the destination computer 110. The PEP 122 communicates the API request (e.g., the entire API request or information characterizing the API request) to the PDP 124.

The PDP 124 generates (block 204) a risk assessment score based on a characteristic of the API request (e.g., using one or more defined rules), such as based on one or more of API request characteristics described below with regard to FIGS. 3-9. The risk assessment score indicates a level of trustworthiness of the source computer application. The PDP 124 communicates (block 206) the risk assessment score to the PEP 122. The PEP 122 controls (block 216) deliverability of the API request to the destination computer 110 for processing based on the risk assessment score. API requests that are deemed to have insufficient trustworthiness, based on the risk assessment score and a defined risk assessment rule, are not delivered to the destination computer 110 in order to shield applications and resources of the destination computer 110 from possible API based intrusion attacks and other malicious or unauthorized operations that may occur if the API requests were allowed to be processed by an application on the destination computer 110.

The PDP 124 may generate the risk assessment score based on syntax and/or timing characteristics of API requests that can be controlled by the source computer application to indicate it trustworthiness for being allowed to use services and/or resources of the destination computer.

The PEP 122 controls (block 216) deliverability of the API request to the destination computer 110 for processing based on the risk assessment score. Depending upon the risk assessment score, the PEP 122 can deliver the API request to the destination computer 110 for receipt (block 218). The destination computer 110 processes (block 220) the API request to generate an API request response (e.g., by retrieving or generating information requested by the API request), and communicates (block 222) the API request response to the source computer 100. The source computer 100 receives (block 224) the API request response, and provides (block 226) the API request response to the application on the source computer 100 for processing.

The PEP 122 may, based on the risk assessment score (e.g. risk assessment score not satisfying a defined threshold value or other risk assessment rule), discard the API request without delivering it to the source computer 110. Alternatively, the PEP 122 may, based on the risk assessment score, initiate further authentication through an authentication challenge process that attempts to authenticate an application on the source computer 100 that generated (block 200) the API request, a person operating the application on the source computer 100, etc. The authentication challenge process includes communicating (block 208) an authentication challenge message to the source computer 100. The source computer 100, or application process thereon, receives (block 210) the authentication challenge message 210 and communicates (block 212) an authentication response message 212, which may contain identification information for the application that generated API request and/or for the source computer 100, and/or which may contain an authentication key or other authentication information (which may be based on one or more authentication processes and technologies known in the art). The PEP 122 validates (block 214) content of the authentication response message and can control (block 216) deliverability of API request based on whether or not the authentication response message was properly validated. For example, when the PEP 122 determines that credentials received in the API request are invalid or otherwise suspicious (e.g., based on a defined validation rule or other risk assessment rule), the PEP 122 may discard the API request without delivering it to the source computer 110.

The PEP 122 may apply API request handling policies for access control that control whether or not the API request is delivered to the destination computer 110, and may also include per-message threat detection, message content transformation, rate limiting, and/or routing to one or more defined other computers of the system for further analysis and/or deliverability decision-making. The policies can include performing call-outs to provide context information for one or more API request to one or more PDPs 124 for generation of risk assessment score(s) used to control deliverability of API request(s).

In another embodiment, instead of the PEP 122 controlling deliverability of the API request to the destination computer 110 for processing based on the risk assessment score, the PEP 122 may instead forward the API request with the risk assessment score to the destination computer 110. The destination computer 110 can then perform policy decision making based on the risk assessment score to determine whether and/or how it will handle processing of the API request. If the risk assessment score does not satisfy a defined policy, the destination computer 110 may, for example, reject the API request, initiate further authentication through an authentication challenge process that attempts to authenticate the source computer 100, the application that generated (block 200) the API request, a person operating the source computer 100, etc.

The communication interface between the PEP 122 and the PDP 124 may be based on a request and response API. The PEP 122 may communicate (block 202) information to the PDP 124 that characterizes the API request (e.g., syntax and/or timing), the application which generated the API request, a unique device identifier for the source computer 100, and/or one or more custom elements associated with the API request, which may include transport meta data (e.g., query or post parameters, URL, HTTP headers, MOM-headers, etc), API request content (e.g., a credit card number), and/or operational state variables of the PEP 122. The operational state variables of the PEP 122 may include, for example, a current rate at which API requests are being received for a particular API of the application of the destination computer 110 and/or for other applications of the destination computer 110; and/or a current rate at which API requests are being received from a particular application of the source computer 100 and/or from other applications of the source computer 100 or other source computers, etc.

Operations that the PEP 122 that can be performed to control deliverability of the API request based on the risk assessment score can include any one or more of: 1) allowing the API request by forwarding it to the destination computer 110; 2) denying the API request by discarding it to prevent its processing by an application of the destination computer 110; 3) delaying delivery of the API request; 4) controlling rate of delivery of a sequence of API requests to the destination computer 110; 5) modifying content of the API request that is then delivered to the destination computer; 6) perform a first/further authentication process before deciding whether to deliver the API request; and 7) other operations described below. The PEP 122 may map different ranges of risk assessment scores to different operations that the PEP 122 performs to control deliverability of the API request, and can thereby use a risk assessment score received from the PDP 124 to select among the available operations to control deliverability of the associated API request.

The mapping of different ranges of risk assessment scores to different available operations to control deliverability of the associated API requests may be configured by an administrator based on the extent of undesirable consequences that can arise from processing of API transmission requests by the destination computer 110. In one embodiment, an administrator can define policies that cause API requests having a score greater than a first defined threshold (e.g., 50) to be discarded (e.g. blocked), cause API requests having a score less than a second defined threshold (e.g., 20) to be allowed to pass through to the destination computer 110 for processing, and cause API requests having a score between the first and second defined thresholds to properly complete further authentication as a prerequisite to being allowed to pass through to the destination computer 110 for processing.

FIGS. 3-9 are flowcharts that illustrate operations that may be performed by the PDP 124 of FIGS. 1 and 2 to generating a risk assessment score (e.g., block 204 of FIG. 2), in accordance with some embodiments.

Figure 3:
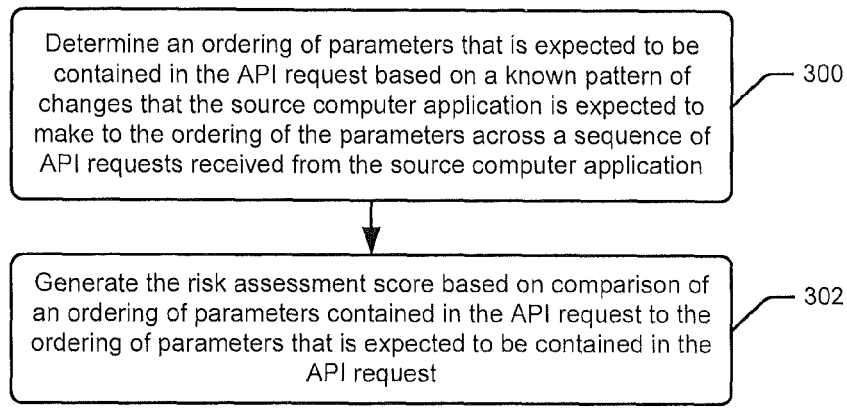
FIGS. 3-12 are flowcharts that illustrate operations that may be performed by one or more components of the API request risk assessment system of FIG. 1, in accordance with some embodiments.

In one embodiment, the source computer application controls an ordering of parameters contained in the sequence of API requests based on a known pattern of changes that the risk assessment system 120 is expecting to observe across the sequence of API requests, to indicate its trustworthiness to the risk assessment system 120. The PDP 124 of the risk assessment system 120 can therefore generate the risk assessment score based on an ordering of the parameters across a series of API requests. Referring to FIG. 3, the PDP 124 determines (block 300) an ordering of parameters that is expected to be contained in the API request based on a known pattern of changes that the application processed by the source computer ("source computer application") 100 is expected to make to the ordering of the parameters across a sequence of API requests received from the source computer application. The PDP 124 generates (block 302) the risk assessment score based on comparison of an ordering of parameters contained in the API request to the ordering of parameters that is expected to be contained in the API request.

For example, when the PDP 124 observes that a API request presently received from the source computer 100 contains parameters having an order that differs from an order of parameters contained in a previously received API request from the source computer 100, and the differences in the order correspond to a known pattern of changes that an authentic instance of the source computer application is expected to make across a sequence of API requests that it outputs, the PDP 124 can generate the risk assessment score to have a value indicating that the source computer application is trustworthy.

Figure 4:
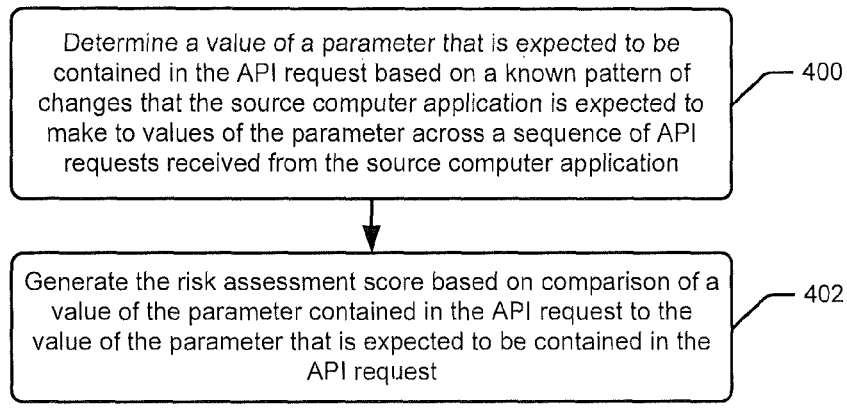

In another embodiment, the source computer application controls values of a parameter contained in the sequence of API requests based on a known pattern of changes that the risk assessment system 120 is expecting to observe in the value of the parameter across the sequence of API requests, to indicate its trustworthiness to the risk assessment system 120. The PDP 124 can therefore generate the risk assessment score based on values of a parameter across a series of API requests. Referring to FIG. 4, the PDP 124 determines (block 400) a value of a parameter that is expected to be contained in the API request based on a known pattern of changes that the source computer application is expected to make to values of the parameter across a sequence of API requests received from the source computer application. The PDP 124 generates (block 402) the risk assessment score based on comparison of a value of the parameter contained in the API request to the value of the parameter that is expected to be contained in the API request.

For example, when the PDP 124 observes that values of a parameter contained in a series of API requests from a source computer application are changing according to an expected pattern, the PDP 124 can generate the risk assessment score to have a value indicating that the source computer application is trustworthy.

Figure 5:
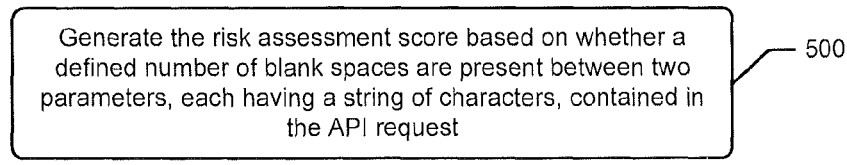

In another embodiment, the source computer application inserts a defined number of blank spaces between two parameters, each having a string of characters, contained in an API request, to indicate its trustworthiness to the risk assessment system 120. The blank spaces can be inserted at locations in the API request that do not affect the syntax of the API request and do not affect processing of the API request by the destination computer application. Referring to FIG. 5, the PDP 124 generates the risk assessment score based on whether a defined number of blank spaces are present between two parameters, each having a string of characters, contained in the API request.

Figure 6:
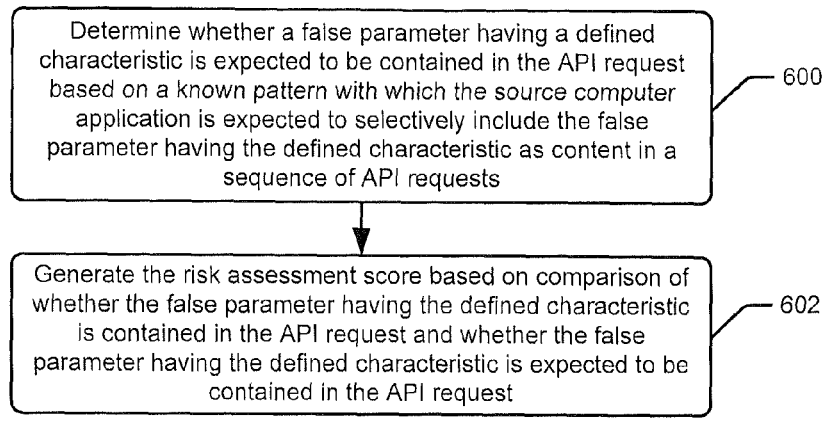

In another embodiment, the source computer application adds false parameters having a defined characteristic as content to some of the API requests that are selected within the sequence based on a known pattern with which the risk assessment system 120 is expecting to observe the false parameters occurring in the sequence of API requests, to indicate its trustworthiness to the risk assessment system 120. The PDP 124 can therefore generate the risk assessment score based on whether the false parameters are observed to occur with the known pattern among the sequence of API requests. Referring to FIG. 6, the PDP 124 determines (block 600) whether a false parameter having a defined characteristic is expected to be contained in the API request based on a known pattern with which the source computer application is expected to selectively include the false parameter having the defined characteristic as content in a sequence of API requests. The PDP 124 generates (block 602) the risk assessment score based on comparison of whether the false parameter having the defined characteristic is contained in the API request and whether the false parameter having the defined characteristic is expected to be contained in the API request.

Figure 7:
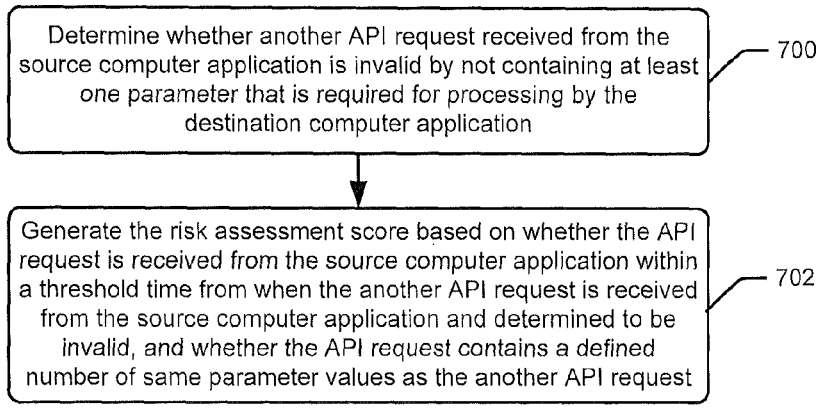

In another embodiment, the source computer application generates a pair of invalid and valid API requests with a threshold time to indicate its level of trustworthiness to the risk assessment system 120. The source computer application generates one of the API requests in the sequence to be invalid by not containing at least one parameter that is required for processing of the one of the API requests by the destination computer application. The source computer application generates another one of the API requests that is output within a threshold time of when the one of the API requests is output (either before or after) and that contains parameters that are required for processing of the another one of the API requests by the destination computer application and contains a defined number of same parameter values as the one of the API requests. Referring to FIG. 7, the PDP 124 determines (block 700) whether another API request received from the source computer application is invalid by not containing at least one parameter that is required for processing by the destination computer application. The PDP 124 generates (block 702) the risk assessment score based on whether the API request is received from the source computer application within a threshold time from when the another API request is received from the source computer application and determined to be invalid, and whether the API request contains a defined number of same parameter values as the another API request.

Figure 8:
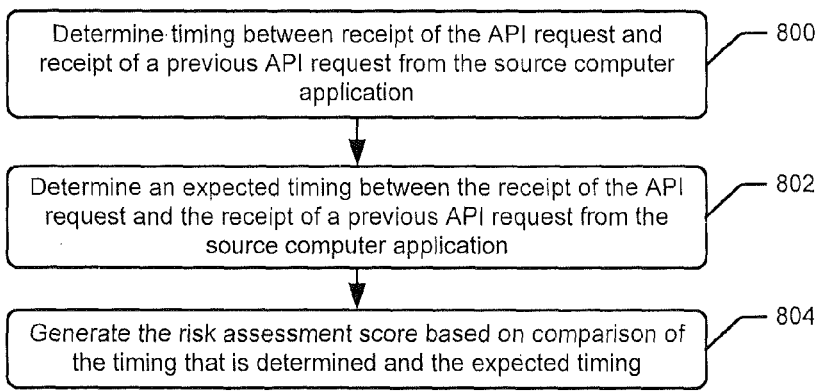

In another embodiment, the source computer application controls timing between when individual ones of the API requests in the sequence are output from the source computer based on a timing that the risk assessment system 120 is expecting to observe between its interception of the individual ones of the API requests in the sequence, to indicate its level of trustworthiness to the risk assessment system 120. Referring to FIG. 8, the PDP 124 determines (block 800) timing between receipt of the API request and receipt of a previous API request from the source computer application. The PDP 124 determines (block 802) an expected timing between the receipt of the API request and the receipt of a previous API request from the source computer application. The PDP 124 generates (block 804) the risk assessment score based on comparison of the timing that is determined and the expected timing. The risk assessment system 120 may determine a communication delay between the source computer and itself, and adjust the expected timing (block 802) to compensate for the determined communication delay. The risk assessment system 120 can thereby use the communication delay to more accurately determine whether the source computer application is outputting the API request with the expected pattern of timings and, thereby, may more accurately determine the trustworthiness of the source computer application.

Figure 9:
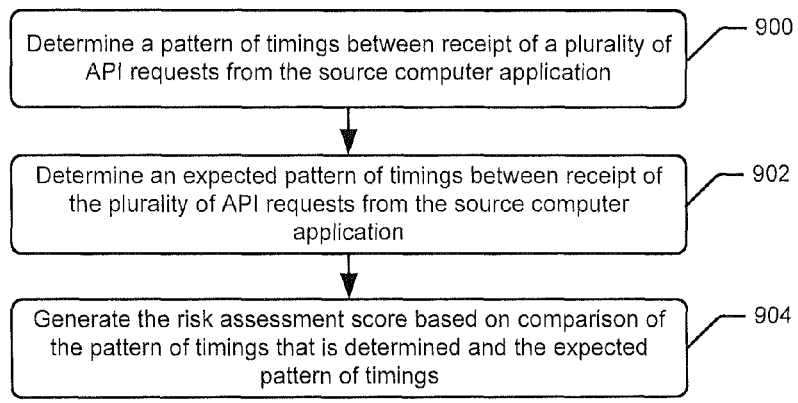

In a further embodiment, the source computer application controls the timing between when individual ones of the API requests in the sequence are output from the source computer based on a pattern of timings that the API request risk assessment system is expecting to observe across its interception of the individual ones of the API requests in the sequence. The source computer application may determine a communication delay between the source computer and the destination computer, and control the timing between when individual ones of the API requests in the sequence are output from the source computer based on the communication delay. In this manner, the communication delay can be determined and used to control timing between when the API requests are output so that the risk assessment system 120 can more accurately use timing between API requests as an indication of the trustworthiness of the source computer application. Referring to FIG. 9, the PDP 124 determines (block 900) a pattern of timings between receipt of a plurality of API requests from the source computer application. The PDP 124 determines (block 902) an expected pattern of timings between receipt of the plurality of API requests from the source computer application, and generates (block 904) the risk assessment score based on comparison of the pattern of timings that is determined and the expected pattern of timings.

Figure 10:
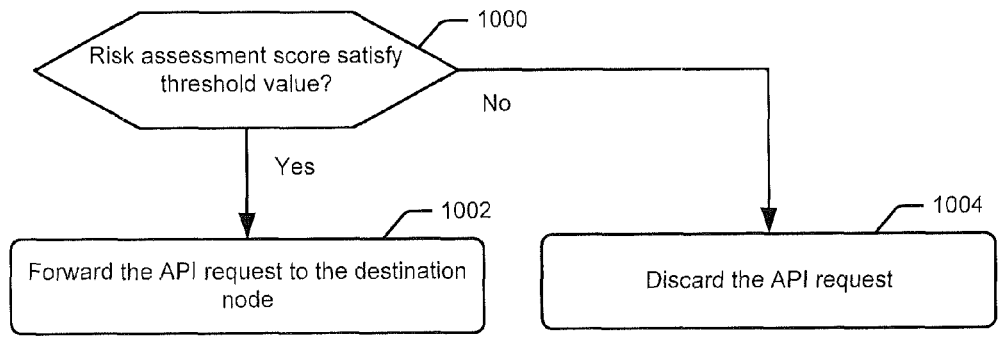
Figure 11:
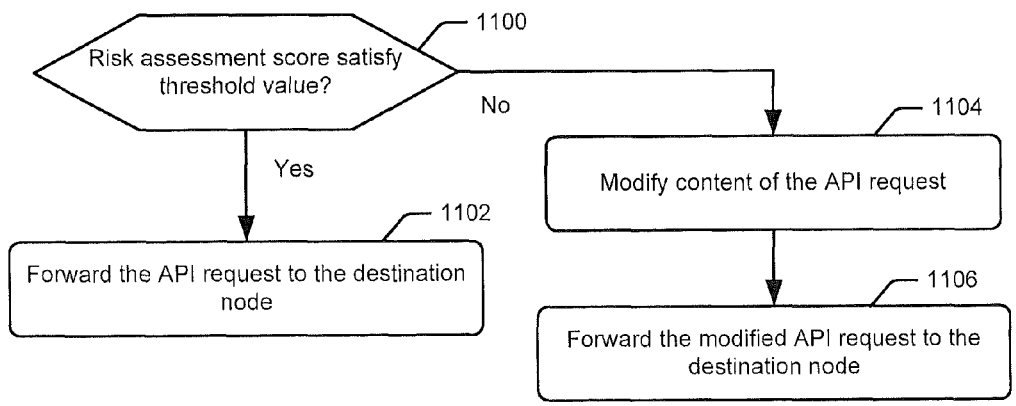
Figure 12:
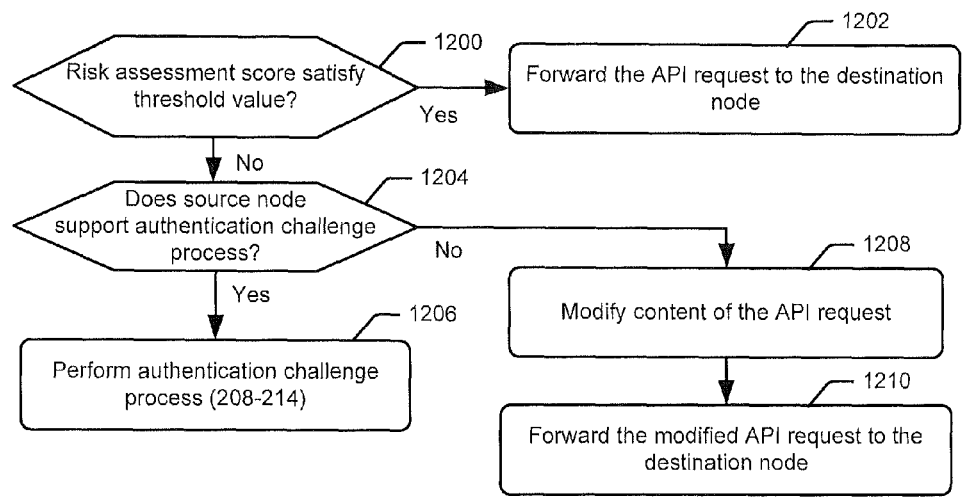

FIGS. 10-12 are flowcharts that illustrate operations that may be performed by the PEP 122 of FIGS. 1 and 2 to control (e.g., block 216 of FIG. 2) deliverability of the API request through a data network to the destination computer 110 for processing based on a risk assessment score generated by the PDP 124, in accordance with some embodiments.

Referring to FIG. 10, the PEP 122 determines whether the risk assessment score satisfies (block 1000) a threshold value. The PEP 122 forwards (block 1002) the API request to the destination computer application based on the risk assessment score satisfying the threshold value. In contrast, the PEP 122 discards (block 1004) the API request to prevent its processing by the application of the destination computer application based on the risk assessment score not satisfying the threshold value. A denial of service message may be communicated back to the source computer application when an API request is discarded, if the source computer application supports such feedback in its API request protocol.

Referring to FIG. 11, the PEP 122 determines whether the risk assessment score satisfies (block 1100) a threshold value, and forwards (block 1102) the API request to the destination computer application based on the risk assessment score satisfying a threshold value or other defined risk assessment rule. In contrast, the PEP 122 modifies (block 1104) content of the API request to generate a modified API request based on the risk assessment score not satisfying the threshold value, and forwards (block 1106) the modified API request to the destination computer application. The PEP 122 may modify (block 1104) content by modifying a variable contained in the modified API request that constrains what type of information will be accessed by the modified API request when processed by the destination computer application.

An example would be if an API request is querying a sensitive database. While some information may be provided at a normal rate, other information may be provided at a slower controlled rate to allow continued inspection of the risk of processing the API request. If the continued inspection of the risk of processing the API request results in a sufficiently untrustworthy risk assessment score, the PEP 122 can terminate any further providing of information from the destination computer application to the source computer application. The risk assessment system 120 may configure the PEP 122 to modify an API request that is requesting 100 rows of information to instead request access to only 20 rows of information if the API request has a sufficiently untrustworthy risk assessment score.

The PEP 122 may selectively perform the authentication process of blocks 208 and 214 based on whether the source computer 100 or source computer application supports the authentication process. Referring to FIG. 12, when the risk assessment score is determined (block 1200) to satisfy a threshold value, the PEP 122 can forward the API request to the destination computer application for processing. Otherwise, when the risk assessment score does not satisfy the threshold value (determined in block 1200), the PEP 122 can further determine (block 1204) whether the source computer 100 supports an authentication challenge process. When the authentication challenge process is supported, the PEP 122 and the source computer application can perform the authentication challenge process of blocks 210-214 of FIG. 2. In contrast, when the authentication challenge process is not supported, the PEP 122 can modify (block 1208) content of the API request to generate a modified API request, and forward (block 1210) the modified API request to the destination computer application. Instead of modifying content of the API request, the PEP 122 may discard the API request to prevent its processing by the destination computer application.

The PDP 124 may operate with the PEP 122 to stop an API request in-flight by having the PEP 122 intercept and hold an API request until it receives the risk assessment score from the PDP 122 and determines therefrom how to control deliverability of the API request to the destination computer 110 for processing by an application.

Alternatively, the PDP 124 may monitor API requests without introducing delay (or substantial delay) as they are communicated through one or more networks for receipt by the destination computer 110. The PDP 124 may analyze the API requests to identify their trustworthy/untrustworthy characteristics (e.g., identify one or more trustworthiness rules that are satisfied or not satisfied by one or more API requests) potentially after completion of their processing by the destination computer application, and may cause defined remedial actions to be performed to undo the result of an earlier processed API request that has now been deemed sufficiently untrustworthy. The PDP 124 may alternatively or additionally notify the destination node 110 and/or another network node when an API transaction request is not to be trusted, which may cause the destination node 110 and/or the network node to take a present action with respect to the API transaction request and/or to take a future action with respect to subsequent API transaction requests from the source computer 100. The PDP 124 may furthermore perform operations based on a web access software architecture provided by the RiskMinder™ product by CA Technologies, Inc.

The PDP 124 may furthermore generate a risk assessment score based on information regarding API requests that are characterized or assessed by other PEPs or by other systems. The PDP 124 may make calls out to other databases to evaluate the API requests. The PDP 124 therefore can be open-ended to include external sources of information as bases for generation of a risk assessment score. The PDP 124 may use information received from a plurality of PEP's when generating a risk assessment score, which may allow the PDP 124 to look for patterns of differences in syntax and/or timing of API request patterns across the system for indications of the trustworthiness of one or more source computer applications.

With further reference to FIG. 2, the PDP 124 can generate (block 204) the risk assessment score based on identification of a characteristic of the application processed by the source computer 100, and generate the risk assessment score based on whether characteristics of a sequence of API requests received from the application processed by the source computer satisfies a rule that defines what characteristics of a sequence of API requests are acceptable to be received in a sequence of API requests from an application having the identified characteristic. The PDP 124 may determine what type of information will be accessed by the API requests in the sequence when processed by the destination computer application, and then generate the risk assessment score based on comparison of the type of information that will be accessed by the sequence of API requests to acceptable types of information defined by the rule. The PDP 124 can keep track of characteristics of API requests in a sequence from a same source computer application, from a same source computer, from a plurality of source computers, etc., to generate improved assessments of trustworthiness of the source computer application(s).

Tracking such sequences may be useful to detect when people try to hack systems by relying upon the fact that the web is not statefull (e.g., each API request contains all information needed to process that request without expecting the destination computer 110 to have retained state information from one or more related earlier API requests). Such hackers can attempt to then deviate from a logical or expected sequence to, for example, obtain access to system resources and/or application information for which they are not authorized to access. The PDP 124 can thereby observe sequences and/or timing of API requests and compare such observations to an expected sequence and/or timing of API requests to determine whether it is a trustworthy (e.g., valid) sequence that is expected from a trustworthy source computer application.

The risk assessment score may furthermore be generated based on a type of device (e.g., mobile phone) that generated the request, a particular type of application (e.g., an application on an iPhone versus an android phone) that generated the request, a type of device operating system, a type of network through which a request is communicated, a particular device ID of the source computer 100, or any other characteristic of the source computer 100 or intervening system components. The PEP 122 and/or the PDP 124 may perform a deep inspection of content of an API request, and compare the content to expected types of variable/field values and ranges of variable/field values, and/or comparison between values of content variables/fields, and generate the risk assessment score based thereon. The PEP 122 and/or the PDP 124 may determine the type of application and/or device of the source computer 100 (e.g., Apple IOS device, Android OS device, Windows OS device, Unix OS device, etc.), and may restrict deliverability and/or privileges of the API request based thereon. For example, the PDP 124 may vary the risk assessment score to cause discarding of the API request based on the API request being received from an iPad device and/or based on a value of the request being outside an expected range.

The PDP 124 may assess each API request separately (e.g., transaction-by-transaction) or may apply risk assessment rules to assess a sequence of API requests to identify trends or patterns that are indicative or trustworthiness of the source computer application outputting the API requests. The PDP 124 can generate the risk assessment score based on a information that characterizes API requests received by a plurality of the policy enforcement points. The PDP 124 can compare individual API requests, sequences, and/or trends from information characterizing API requests received from a plurality of source computers 100 processing what appears to be the same application, and/or which is provided by a plurality of different PEPs 122.

The PEP 122 can select and apply remediation actions to control deliverability of a presently received API request and/or future received API requests, and/or to remedy actions caused by processing performed by the destination computer 110 and/or by the source computer 100. The remediation actions may then be applied to change mapping between ranges of risk assessment scores and corresponding actions performed by the PEP 122 to control deliverability of API requests. Such operations may help to reduce the potential of applications becoming compromised by malicious parties attempting to use limitations of application-to-application communication protocols (e.g., state less transaction protocols).

Operations for controlling deliverability of API requests can include computer/application privilege management. An API request can be handled differently based on an authentication level determined for the source computer 100 or an application processed by the source computer 100 which generated the API request, and/or based on identification of a user of the source computer application. Different source computers and/or source computer applications can have different authentication levels. When a source computer and/or application has properly performed a step up access control process, the source computer application can be granted a more trusted authentication level (e.g., a root account), and API requests received from that source computer application can be handled using different deliverability control rules and/or different flow control. For example, the PEP 122 may, depending upon the authentication level of the source computer application, either intercept and hold API requests from that source computer application before selectively delivering to the destination computer 110 or allow uncontrolled delivery to the destination computer 110 with continuing assessment of risk associated with the API requests. The authentication level of the source computer application may be adjusted over time based on comparison of characteristics of the API requests to risk assessment rules.

Content of the API requests can be modified based on the authentication level of the source computer application. Different data can be thereby be provided by the destination computer depending upon the authentication level of the source computer application. When operating at a root level, API requests from the source computer application can cause the destination computer 110 to provide a greater quantity of information, more sensitive information, etc. in API request responses. For example a root level source computer application that is querying user accounts can be provided a larger set of data (full account details) then a non-root level source computer application that may be provided only the account names and associated name of the persons. The amount of information and/or type of information that is returned responsive to an API request can thereby be dynamically controlled by modification of content of the API request based on the risk assessment score.

The PDP 124 can obtain risk assessment rules from a remote repository(ies) (e.g., a centralized repository used by a plurality of PDPs) and/or an internal repository, and may develop or modify risk assessment rules over time, such as based on feedback received from the PEP 122, the destination computer 110 and/or the source computer 100 and/or application thereon.

Figure 13:
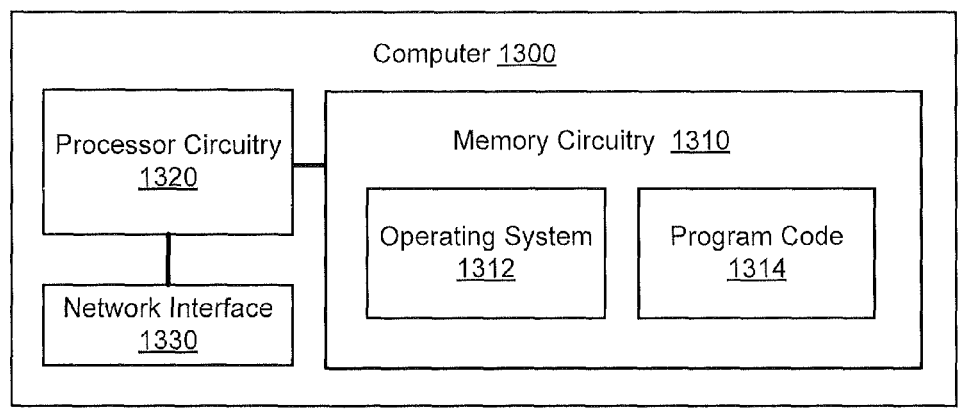
FIG. 13 is a block diagram of a computer that may be used to perform operations of one or more components of an API request risk assessment system, an API client computer or other source computer, and/or an application server or other destination computer, such as those shown in FIG. 1, in accordance with some embodiments.

FIG. 13 is a block diagram of a computer 1300 that may be used as one or more components (e.g., PEP 122 and/or PDP 124) of the API request risk assessment system 120, the source computer 100, and/or the destination computer 110 of FIG. 1, in accordance with some embodiments. Referring to FIG. 13, the computer 1300 can include a network interface 1330 which communicates via the one or more networks 108*a/b* with other components of the system. The computer 1300 includes processor circuitry 1320 and memory circuitry 1310 that contains computer program instructions, such as an operating system 1312 and program code 1314 which performs various operations disclosed herein when executed by the processor 1320. The processor circuitry 1320 may include one or more data processing circuits, such as a general purpose and/or special purpose processor (e.g., microprocessor and/or digital signal processor), which may be collocated or distributed across one or more data networks (e.g., networks 108*a-b*). The processor circuitry 1320 is configured to execute computer program instructions from the memory circuitry 1310, described below as a computer readable medium, to perform some or all of the operations and methods for one or more of the embodiments disclosed herein.

Further Definitions and Embodiments

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus, and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" or "/" includes any and all combinations of one or more of the associated listed items.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method of operating an application programming interface (API) request risk assessment system, the method comprising:
  receiving an API request from a source computer application that is directed to a destination computer application;
  generating a risk assessment score based on a characteristic of the API request, the risk assessment score indicating a level of trustworthiness of the source computer application; and
  controlling deliverability of the API request to the destination computer application based on the risk assessment score,
  wherein generating the risk assessment score based on the characteristic of the API request, comprises:
    determining an ordering of parameters that is expected by the API request assessment system to be contained in the API request based on a known pattern of changes that an authentic instance of the source computer application is expected to make to the ordering of the parameters across a sequence of API requests that have been previously received from the source computer application;
    identifying an ordering of parameters contained in the sequence of API requests that have been previously received from the source computer application;
    identifying differences between an ordering of parameters contained in the API request and the ordering of parameters contained in the sequence of API requests that have been previously received from the source computer application; and
    generating the risk assessment score based on comparison of the identified differences to the known pattern of changes that the authentic instance of the source computer application is expected to make to the ordering of the parameters across the sequence of API requests that have been previously received and the API request from the source computer application.

2. A method of operating an application programming interface (API) request risk assessment system, the method comprising:
  receiving an API request from a source computer application that is directed to a destination computer application;
  generating a risk assessment score based on a characteristic of the API request, the risk assessment score indicating a level of trustworthiness of the source computer application; and
  controlling deliverability of the API request to the destination computer application based on the risk assessment score,
  wherein generating the risk assessment score based on the characteristic of the API request, comprises:
    determining a value of a parameter that is expected by the API request assessment system to be contained in the API request based on a known pattern of changes that an authentic instance of the source computer application is expected to make to values of the parameter across a sequence of API requests that have been previously received from the source computer application;
    identifying values of the parameter contained in the sequence of API requests that have been previously received from the source computer application;
    identifying differences between a value of a parameter contained in the API request and the values of parameter contained in the sequence of API requests that have been previously received from the source computer application; and
    generating the risk assessment score based on comparison of the identified differences to the known pattern of changes that the authentic instance of the source computer application is expected to make to the ordering of the parameters across the sequence of API requests that have been previously received and the API request from the source computer application.

3. The method of claim 2, wherein generating the risk assessment score further based on whether a defined number of blank spaces are present between two parameters, each having a string of characters, contained in the API request.

4. The method of claim 1, wherein controlling deliverability of the API request to the destination computer application based on the risk assessment score, comprises:
  forwarding the API request to the destination computer application based on the risk assessment score satisfying a threshold value; and
  discarding the API request to prevent its processing by the destination computer application based on the risk assessment score not satisfying the threshold value.

5. The method of claim 1, wherein controlling deliverability of the API request to the destination computer application based on the risk assessment score, comprises:
  forwarding the API request to the destination computer application based on the risk assessment score satisfying a threshold value; and
  modifying content of the API request to generate a modified API request and forwarding the modified API request to the destination computer application based on the risk assessment score not satisfying the threshold value.

6. The method of claim 1, wherein controlling deliverability of the API request to the destination computer application based on the risk assessment score, comprises:
  forwarding the API request to the destination computer application based on the risk assessment score satisfying a threshold value; and
  discarding the API request to prevent its processing by the destination computer application based on the risk assessment score not satisfying the threshold value.

7. The method of claim 1, wherein controlling deliverability of the API request to the destination computer application based on the risk assessment score, comprises:
  forwarding the API request to the destination computer application based on the risk assessment score satisfying a threshold value; and
  modifying content of the API request to generate a modified API request and forwarding the modified API request to the destination computer application based on the risk assessment score not satisfying the threshold value.

8. The method of claim 2, wherein controlling deliverability of the API request to the destination computer application based on the risk assessment score, comprises:
- forwarding the API request to the destination computer application based on the risk assessment score satisfying a threshold value; and
- discarding the API request to prevent its processing by the destination computer application based on the risk assessment score not satisfying the threshold value.

9. The method of claim 2, wherein controlling deliverability of the API request to the destination computer application based on the risk assessment score, comprises:
- forwarding the API request to the destination computer application based on the risk assessment score satisfying a threshold value; and
- modifying content of the API request to generate a modified API request and forwarding the modified API request to the destination computer application based on the risk assessment score not satisfying the threshold value.

* * * * *